Figure 1:
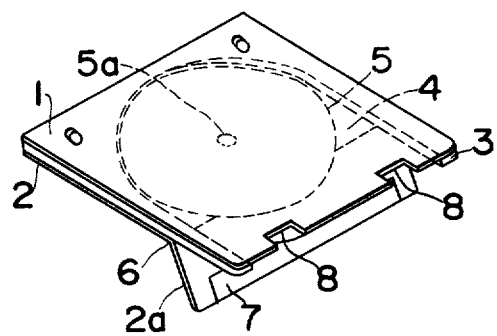

United States Patent [19]

Takahara et al.

[11] 3,931,640
[45] Jan. 6, 1976

[54] AUTOMATIC FLEXIBLE RECORD FEEDING DEVICE

[75] Inventors: Ichiro Takahara, Kadoma; Tadahiko Yabu; Takashi Miwa, both of Hirakata, all of Japan

[73] Assignee: Sanyo Electric Company, Ltd., Japan

[22] Filed: Mar. 22, 1974

[21] Appl. No.: 453,854

[30] Foreign Application Priority Data

Apr. 4, 1973   Japan.............................. 48-39706

[52] U.S. Cl. ..................... 360/86; 271/119; 360/2; 360/98; 360/99; 360/135
[51] Int. Cl.[2] G11B 17/04; G11B 5/012; G11B 5/80
[58] Field of Search ............ 360/99, 97, 87, 135, 2, 360/133, 86; 271/275, 119

[56] References Cited
UNITED STATES PATENTS

| | | | |
|---|---|---|---|
| 2,946,593 | 7/1960 | Beyer | 360/87 |
| 3,158,366 | 11/1964 | Godlewski | 271/119 |
| 3,506,258 | 4/1970 | Lindquist | 271/119 |
| 3,836,731 | 9/1974 | Wilisch et al. | 360/133 |

*Primary Examiner*—Alfred H. Eddleman
*Attorney, Agent, or Firm*—Armstrong, Nikaido & Wegner

[57] ABSTRACT

An automatic record feeding device particularly advantageous for use in association with a flexible foil-type video disc record used by a video disc player. The record feeding device includes a transfer roll having at least one escapement recess or notch formed in the outer peripheral surface thereof, and a back-up guide cooperative with the transfer roll to hold the disc record between it and the transfer roll during transfer of the disc record from one position to another.

4 Claims, 10 Drawing Figures

AUTOMATIC FLEXIBLE RECORD FEEDING DEVICE

The present invention relates to an automatic record feeding device for use in a video disc player.

The video disc player is known as an instrument capable of mechanical playback or reproduction, through a television receiver, of video and/or audio information previously recorded in the spirally inwardly extending groove in a flexible foil-type disc record. In order, for example, to reproduce video information, i.e., one or both of the video and audio signals that have been recorded on the disc record, most commercially available video disc players employ a disc record driving system by which the disc record is driven only at its center at a relatively high speed, for example, at 1,800 rpm. and, while being rotated, hovers on a rotation-induced air cushion above a stationary plate or table. A scanner having a scanning stylus moves across the disc record in the radial direction with the scanning stylus mechanically engaged in the spiral groove on the disc record.

Rotation of the disc record is effected by a rotatable spindle having one end operatively coupled to an electrical drive motor and the other end loosely extending through the stationary table and provided, either integrally or separately, with a record mount. During operation, the disc record is supported on and firmly held in position by the record mount for rotation together with the rotatable spindle.

While the video disc player of the type referred to above employs a mechanical transducer, that is, the scanning stylus, in relation to the grooved disc record similar to a phonograph record, another type of video disc player which employs a magnetic transducer in relation to a magnetic disc record made of magnetizable material similar to a magnetic recording tape is also known.

The automatic record feeding device to which the present invention pertains is practically applicable in any of these types of video disc player and is designed to automatically feed a disc record onto the stationary table with the central opening thereof aligned with the record mount and, after the performance has completed, to automatically disengage the disc record from the stationary table and feed it back to the original position, for example, into a disc record protective jacket.

A prior art technique of automatic record feed in a video disc player employs at least two sets of pairs of drive and driven pinch rollers, which are arranged such as to feed a disc record in a substantially linear direction in parallel relation to the uppermost surface of the stationary table. The pinch rollers of these sets are selectively moved close to and away from the associated drive rollers in synchronism with each other and when they are moved close to the drive rollers in readiness for transfer of the disc record from a stand-by position to another position immediately above the stationary table or from the stationary table to the stand-by position, the disc record is drawn through a gap between the drive and pinch rollers of each pair.

This technique requires a relatively great number of rollers and movable mechanical parts together with a considerably complicated linkage system for synchronously and precisely moving the pinch rollers relative to their associated drive rollers. Moreover, since the feed roller arrangement is located at one side of the stationary table, the video disc player equipped with the automatic record feeding device of this prior art type tends to become bulky, requiring a relatively large space for installation.

Accordingly, an essential object of the present invention is to provide an automatic record feeding device for use in a video disc player, which employs a single feed or transfer roll, thereby substantially eliminating the disadvantages and inconveniences inherent in the prior art device of a similar kind.

Another important object of the present invention is to provide an automatic record feeding device of the type referred to above, wherein the transfer roll has one or more escapement spaces or recesses extending in parallel to the longitudinal axis of said transfer roll, which provide a clearance for the disc record when the latter is inserted into the protective jacket and when the same hovers on a rotation-induced air cushion above the stationary table.

A further object of the present invention is to provide an automatic record feeding device of the type referred to above, wherein the transfer roll cooperates with a back-up guide forming between it and the transfer roll a curved passage along which the disc record is transferred from a stand-by position to the stationary table or from the stationary table to the Stand-by position as the transfer roll is rotated about its own axis in either direction.

A still further object of the present invention is to provide an automatic record feeding device of the type referred to above, which does not require an operator or user of a video disc player to carefully handle the disc record, is easy to operate and can be easily manufactured at relatively low costs.

Figure 2:
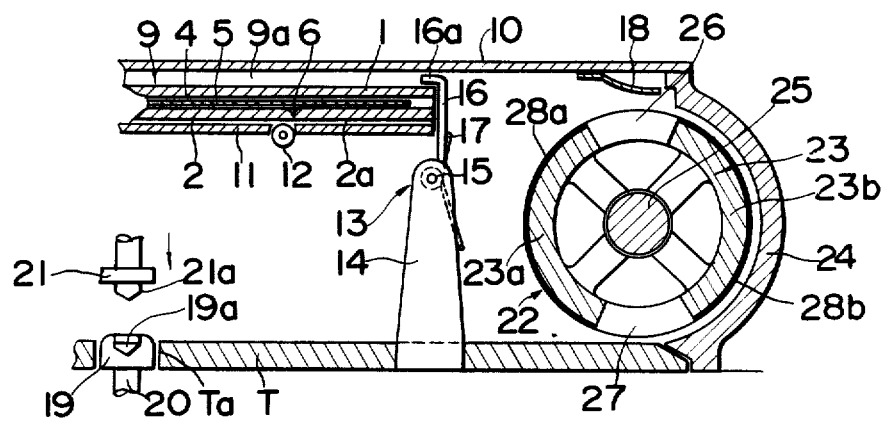
Figure 3:
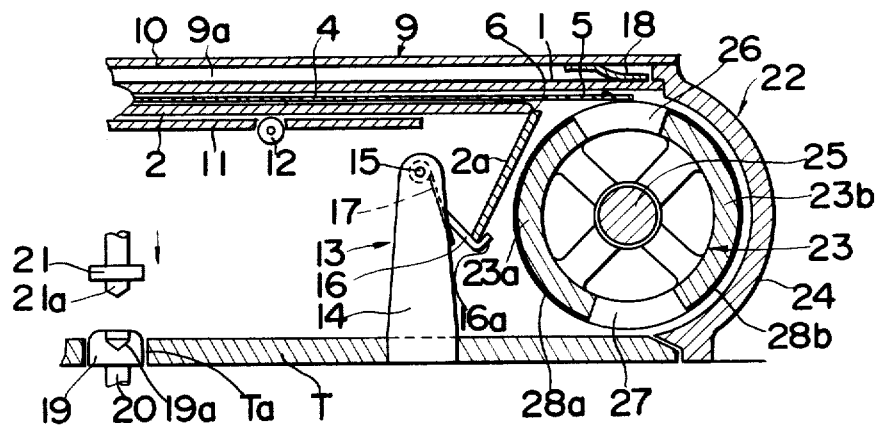
Figure 4A:
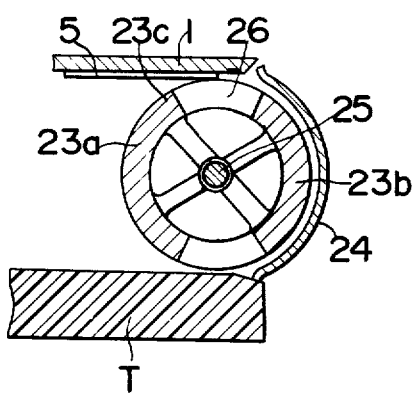
Figure 4D:
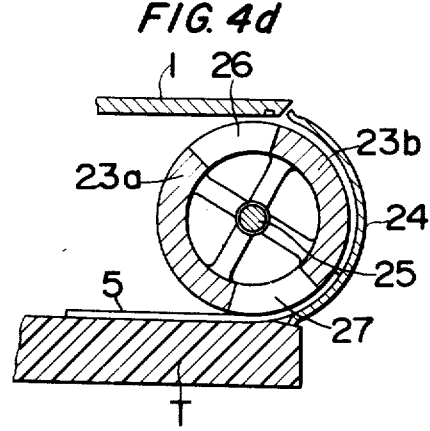
Figure 4B:
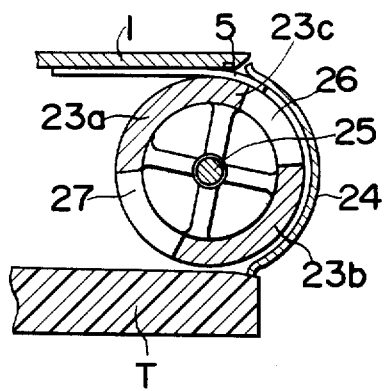
Figure 4E:
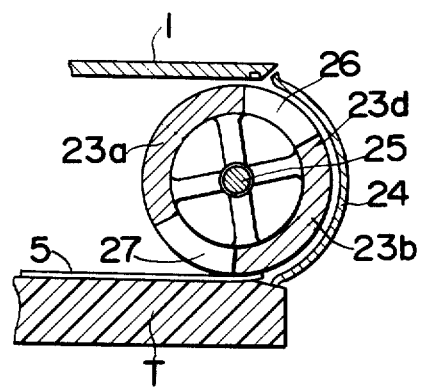
Figure 4C:
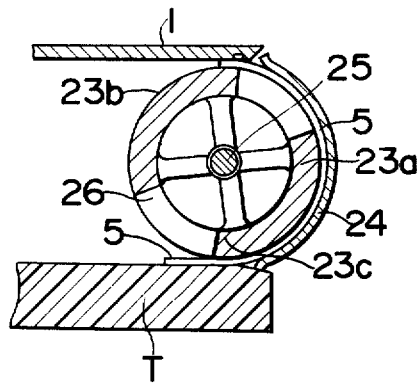
Figure 4F:
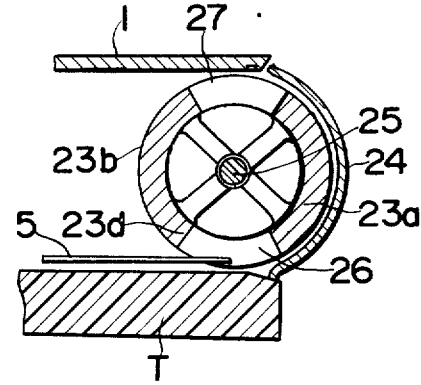
Figure 5:
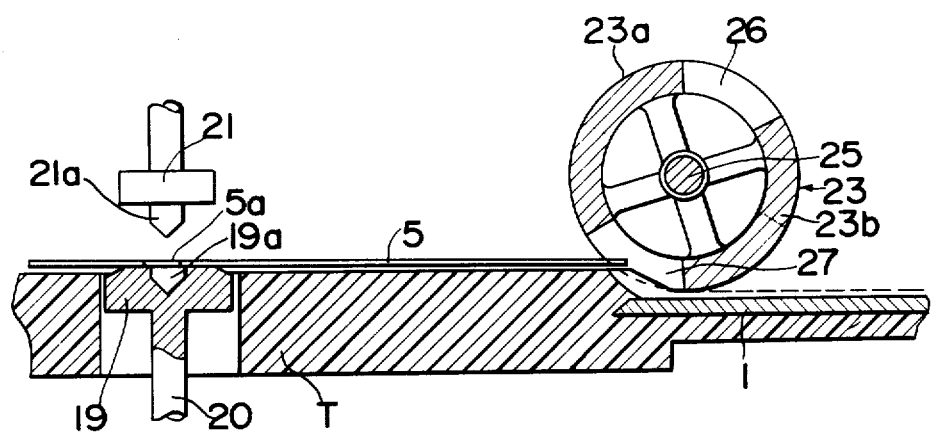

These and other objects and features of the present invention will become apparent from the following description taken in conjunction with preferred embodiments thereof with reference to the accompanying drawings, in which;

FIG. 1 is a perspective view of a record protective jacket which is most suitable for use in association with an automatic record feeding device of the present invention, FIG. 2 is a side sectional view of an essential portion of a video disc player in which the automatic record feeding device of the present invention is embodied, with a lid opener shown in one operative position, FIG. 3 is a similar view to FIG. 2, showing the lid opener in another operative position, FIGS. 4(a) to (f) are schematic diagrams of a sequence of operation of a transfer roll in the prescribed order, showing how the disc record is transferred from the record protective jacket to the stationary table, and FIG. 5 is a similar view to FIG. 2, but showing another embodiment of the present invention.

Before the description of the present invention proceeds, it should be noted that like parts are designated by like reference numerals throughout the accompanying drawings. It should also be noted that, impractising the automatic record feeding device according to the present invention, it is essential to employ a flexible foil-type disc record that is accommodated in a record protective jacket of a substantially box-shaped type. By way of example, the most suitable type of record protective jacket is shown in FIG. 1 and disclosed in the copending U.S. patent applications Ser. Nos. 422,865 and 440,198, filed on Dec. 7, 1973 and Feb. 5, 1974 and entitled "Video Disc Player" and "Record Protective Jacket", respectively, both of which are assigned to the same assignee of the present invention.

For facilitation of a better understanding of the present invention, a construction of the record protective jacket will now briefly be described with reference to FIG. 1, but the details thereof may be available from the above numbered copending patent application and, therefore, are herein omitted.

Referring now to FIG. 1, the record protective jacket, which is most suitable for use in association with the automatic record feeding device of the present invention, comprises a pair of plates 1 and 2 jointed to each other through a substantially U-shaped spacer 3 situated therebetween, thereby forming a room 4 for the disc record 5. One of the plates 2 is formed as at 2a into a lid which pivots about a line of weakness 6, which is, for example, in the form of a substantially V-shaped notch or groove formed in the plate 2, for selectively opening and closing the room 4. A magnetic strip 7, which may be a magnet or an elastic material mixed with powdered magnet, is plated to the front edge of the lid 2a and cooperates with a metallic strip (not shown) plated to the front edge of the plate 1 to hermetically seal the room 4. A pair of notches 8 are formed at the front of the plate 1 for the purpose as will be described later.

While the record protective jacket is constructed in the manner as hereinbefore described, it should be noted that the automatic record feeding device according to the present invention can accommodate a record protective jacket of any other types provided that it has a hingedly supported lid which, in an opened position, permits a front portion of the disc record within the jacket to be outwardly exposed.

Referring to FIGS. 2 and 3, the automatic record feeding device according to the present invention basically comprises a jacket holder 9 suitably supported immediately above a stationary table T and having therein a jacket receiving chamber 9a, a jacket lid opener for opening the lid 2a of the jacket as the latter is inserted into the jacket receiving chamber 9a of the jacket holder 9 and a record feeder for feeding a disc record within the jacket out of the jacket and onto the stationary table T.

The jacket holder is composed of a pair of spaced side walls (not shown) and a pair of spaced upper and lower plates 10 and 11 of different length and has the jacket receiving chamber 9a defined by these side walls and upper and lower plates 10 and 11. The jacket holder 9 should be understood as having a jacket locking and ejecting mechanism for locking the jacket in position within the jacket holder 9 before performance of the disc record and ejecting the same out of the jacket receiving chamber 9a after completion of such performance, through the mechanism is not shown in the drawings. However, the details of the locking and ejecting mechanism, which is not a subject matter of the present invention, are fully disclosed in the first mentioned copending patent application entitled "Video Disc Player" and, therefore, reference may be made thereto.

Furthermore, the jacket holder 9 may have a plurality of elongated rollers, as at 12, for facilitating movement of the jacket into and out of the jacket receiving chamber 9a.

The lid opener, generally indicated by 13, comprises upright support arms 14, which may be of one-piece construction and which is rigidly mounted on a suitable chassis, a spindle 15 having both ends journalled, or otherwise rigidly secured, to the upright support arms 14 and bridging over a portion of the stationary table T and a pivotable plate 16 having one end rotatably mounted on said spindle 15 between said arms 14 and the other end integrally formed with a pair of finger members 16a spaced from each other in a distance substantially equal to the space between the notches 8, formed in the upper plate 1 of the jacket (FIG. 1), for engagement with relevant portions of the lid 2a of the jacket. The pivotable plate 16 is held in an upstanding position, as shown in FIG. 2, by a coiled spring 17 while it abuts against the rear of the plate 11 forming a part of the jacket holder 9.

While in the above construction, the lid opener 13 operates in such a manner as follows. As the jacket is inserted into the jacket receiving chamber 9a of the jacket holder 9, the front edge of the lid 2a contacts the pivotable plate 16 with the finger members 16a positioned immediately above the notches 8 and subsequently causes the pivotable plate 16 to pivot about the spindle 15 against the coiled spring 17. Further insertion of the jacket into the jacket receiving chamber 9a causes the finger members 16a to engage the lid 2a through the associated notches 8 while said pivotable plate 16 continues to pivot about the spindle 15 against the coiled spring 17 and, at the same time as the line of weakness 6 emerges from the rear edge of the lower plate 11 of the jacket holder 9, the lid 2a is downwardly bent about said line of weakness 6 as shown in FIG. 3. At the time of completion of the jacket insertion, a portion of the jacket adjacent to the front edge thereof is firmly held in position by a retainer 18 supported to the upper plate 10 and made of a spring metal, while the lid 2a is completely opened with a front portion of the disc record 5 within the jacket exposed substantially downwards as shown in FIG. 3.

Removal of the once-inserted jacket results in automatic closing of the lid 2a in contact with the rear edge of the lower plate 11 of the jacket holder 9 while the plate 16 is similarly returned to the upstanding position by the coiled spring 17.

Reference is now made to the arrangement of the stationary table T. As is well known to those skilled in the art, the stationary table T is formed as at Ta with a central opening in which a record mount 19 is situated. The record mount 19 is rigidly mounted on a spindle 20 for rotation together with said spindle 20, said spindle 20 being in turn coupled to a drive motor (not shown) in any known manner. As shown, the record mount is formed with an engagement recess 19a of a diameter substantially equal to the central opening 5a of the disc record and is cooperative with a clamper 21 having a downwardly extending projection 21a shaped to fit to the shape of the engagement recess 19a and detachably engageable into said recess 19a. It should be noted that, once the clamper 21 is mounted on the record mount 19 with the projection 21a extending through the central opening 5a of the disc record 5 and engaged into the engagement recess 19a, the clamper 21 is magnetically secured to said record mount 19 to firmly hold the disc record to enable the latter to be rotated together with the spindle 20. This arrangement as well as means for engaging and disengaging the clamper 21 relative to the record mount 19 are also disclosed in the first mentioned copending patent application entitled "Video Disc Player" and, therefore, reference may be made thereto for the detailed information thereof.

Alternatively, means for connecting the disc record 5 to the drive spindle 20 may be of any known type. In any case, it should be understood that the upper peripheral edge of the record mount 19 remote from the spindle 20 is downwardly inclined or curved towards the record resting surface of the stationary table T so that the disc record moving or creeping on the stationary table T can slide thereover until the central opening 5a thereof is aligned with the engagement recess 19a in the record mount 19, without being obstructed by said record mount 19.

Referring still to FIGS. 2 and 3, the record feeder is generally referenced by 22 and includes a transfer roll 23 of substantially cylindrical shape for transferring the disc record 5 between the jacket in the jacket holder 9 and the stationary table T, a back-up guide 24 of substantially semi-circular cross section which cooperates with said transfer roll 23 in such a way as to hold the disc record between it and the outer peripheral surface of said transfer roll 23 during transfer of the disc record therebetween.

The transfer roll 23 is rotatably supported in position adjacent to and immediately above the outer peripheral portion of the record resting surface of the stationary table T as shown and is mounted on a shaft 25 for rotation together with said shaft 25. This transfer roll 23 is provided with one or more escapement recesses on the outer peripheral wall thereof. In the illustrated embodiment, for the sake of clarification, two escapement recesses 26 and 27 are shown as formed on the outer peripheral wall of the transfer roll 23 displaced 180° with respect to each other about the axis of the shaft 25, each of said escapement recesses 26 and 27 extending substantially completely through the width of said roll 23 which is slightly greater than the greatest possible outer diameter of a flexible foil-type disc record commercially available for use in a video disc player of this kind.

By the provision of these escapement recesses 26 and 27, it will be seen that the peripheral wall of the transfer roll 23 is divided into two segments 23a and 23b of substantially semi-circular cross section as shown. Outer surfaces of these segments 23a and 23b forming the transfer roll 23 are lined with friction linings 28a and 28b both made of the same material such as soft rubber or foam material or any other suitable material having a relatively high frictional coefficient and a sufficient elasticity.

Opposed to the transfer roll 23, the back-up guide 24 is rigidly supported above a chassis which may be an integral part of the stationary table T. This back-up guide 24 has an inwardly rounded smooth surface, which fits to the curvature of the peripheral wall of the transfer roll 23, and is so positioned relative to the transfer roll 23 as to ensure, with no fault, transfer of the disc record 5 in a curved path while said disc record is sandwiched between it and said transfer roll 23, more particularly, the segments 23a and 23b. During this transfer, the disc record 5 contacts the friction linings 28a and 28b on one surface and slidingly contacts the inwardly rounded smooth surface of the guide 24 on the opposite surface, a detailed manner of this transfer being subsequently described with reference to FIGS. 4(a) to (f).

However, it should be noted that the outer circumference of the transfer roll 23 has to be determined in consideration of the largest possible size of the commercially available flexible foil-type disc record, although the transfer roll 23 so far shown in FIGS. 4(a) to (f) is exaggerated as having an outer circumference somewhat smaller than twice the outer diameter of the disc record 5 for facilitating a better understanding of the operation of the record feeder 22 of the above described arrangement.

Assuming now that the jacket with the disc record 5 therein has been completely inserted into the jacket receiving chamber 9a of the jacket holder 9 as shown in FIG. 3 and that the transfer roll 23 is, as shown in FIGS. 3 and 4, positioned with one of the escapement recesses 26 in register with the front of the disc record 5 that has been exposed outside the jacket, clockwise rotation of the transfer roll 23 causes the segment 23a of the roll 23 to engage the disc record 5 in such a manner that one of the opposite outer edges, as at 23c, of the segment 23a contacts an exposed portion rearwards of the front of the disc record 5. Continued clockwise rotation of the roll 23 permits the disc record 5 to be drawn out of the jacket within the jacket receiving chamber 9a without accompanying any relative slip between the disc record 5 and the segment 23a, the front of the disc record 5 thereby entering the curved path defined between the transfer roll 23 and the guide 24 as shown in FIG. 4(b).

The disc record 5 having been moving in the curved path caused by the clockwise rotation of the transfer roll 23 approaches the record resting surface of the stationary table T and, as shown in FIG. 4(c), the front of the disc record 5 subsequently slides over said record resting surface of the stationary table T.

It is to be noted that, if the outer circumference of the transfer roll 23 is exactly twice the outer diameter of the disc record, a single rotation of the transfer roll 23 is sufficient to transfer the disc record between the jacket within the jacket holder 9 and the stationary table T. However, so far shown in FIGS. 4(a) to (f), since the outer circumference of the transfer roll 23 has been described somewhat smaller than twice the outer diameter of the disc record, the rear of the disc record 5 is still situated within the curved path between the transfer roll 23 and the guide 24 at the time the transfer roll 23 substantially completes one clockwise rotation as shown in FIG. 4(d).

FIG. 4(e) illustrates a condition in which the whole surface of the disc record 5 has been brought above the record resting surface of the stationary table T, with the rear thereof completely leaving from the curved path. However, as clearly shown, the rear of the disc record on the stationary table T is still sandwitched between the roll segment 23b and the peripheral portion of the stationary table T. Starting from the condition shown in FIG. 4(e), as the transfer roll 23 is further rotated in the clockwise direction about the axis of the shaft 25, the rear of the disc record 5 relatively separates from the roll segment 23b. Rotation of the transfer roll 23 is thereafter continued until the next adjacent escapement recess 26 is brought above the stationary table T and in register with the rear of the disc record substantially as shown in FIG. 4(f).

The disc record 5 moving on the record resting surface of the stationary table T during the foregoing process rides, in practice, over the record mount 19 (FIGS. 2 and 3) and, at the time of completion of its movement, the central opening 5a (FIG. 1) is aligned with the record mount 19 in readiness for receipt of the projection 21a that will extend therethrough into the engagement recess 19a to firmly hold the record 5 between the clamper 21 and the record mount 19 for rotation together with the spindle 20.

It should be noted that, since the disc record 5 on the stationary table T is adapted to hover on a rotation-induced air cushion present between the disc record 5 and the record resting surface of the stationary table T during video playback as can be well understood by those skilled in the art and as shown in FIG. 4(f), the position of the escapement recess 26 relative to the stationary table T should be such that one of the opposite edges of the roll segment 23b, that is situated immediately above the disc record 5 on the stationary table T as indicated by 23d, is spaced a predetermined and sufficient distance from the disc record 5 then hovering on the rotation-induced air cushion created between said record 5 and said table T.

In the record feeder 22 of the above described arrangement, even though the disc record 5 drawn out of the record jacket within the jacket receiving chamber 9a of the jacket holder 9 is curved during its travel through the curved path between the transfer roll 23 and the guide 24, the disc record 5 is so elastic that it tends to stretch straight and, therefore, once the front of said disc record 5 has contacted the stationary table T, it rests on the record resting surface of the stationary table T without curling.

Reverse rotation of the transfer roll 23 in the opposite, i.e., counterclockwise, direction brings the disc record 5 on the stationary table T back to the jacket within the jacket holder 9, transferred in a substantially similar, but opposite, manner as the sequence shown in FIGS. 4(a) to (f). However, it should be noted that, shortly before the reverse rotation of said transfer roll 23 completes, the disc record 5 is completely inserted in position within the jacket and, at the time of completion of the reverse rotation, the escapement recess 26 is returned to the original position and is situated immediately below the front of the disc record 5 within the jacket.

Rotation of the transfer roll 23 in either direction, i.e., rotation of the shaft 25 in either direction, may be manually done, in which case either of both ends of the shaft 25 should be coupled to an operating knob accessible to the operator or user. In practice, the operating knob is in turn operatively coupled to the clamper 21 in such a way that, only when the disc record 5 has been completely transferred to the stationary table, the clamper descends with the projection 21a engaged into the engagement recess 19a through the central opening 5a of the disc record 5 and, when the disc record 5 on the stationary table T is transferred from the stationary table back to the jacket, the clamper that has been lowered commences to upwardly elevate. This system is fully disclosed in the first mentioned copending patent application entitled "Video Disc Player" and, therefore, the details thereof may be available therefrom.

From the foregoing description of the operation of the feeder 22, it will be seen that the escapement recess 27 performs no function in the illustrated embodiment function nothing therefore, a single escapement recess 26 suffices. Accordingly, the number of the escapement recesses formed in the transfer roll 23 may not be always limited to two as in the case of the illustrated embodiment and at least one or more than two escapement recesses may be employed.

Although in the foregoing embodiment the disc record 5 has been described as transferred from the jacket holder 9 above the stationary table to the stationary table and from the stationary table to the jacket holder 9, transfer of the disc record 5 from lateral side of the stationary table T is possible as shown in FIG. 5. In the embodiment shown in FIG. 5, for facilitating movement of the disc record 5 from the jacket resting on a support bench Tb integrally extending from the stationary table T onto the stationary table T, a portion of the outer peripheral edge of the stationary table adjacent to the transfer roll 23 should be inwardly rounded in accordance with the curvature of the transfer roll 23 as indicated by Tc. Even this embodiment of FIG. 5 functions substantially in a substantially similar manner as the foregoing embodiment, while the inwardly rounded edge Tb serves as a back-up guide corresponding to the back-up guide 24 of the foregoing embodiment.

Although the present invention has been fully described with reference to the preferred embodiments thereof shown in the accompanying drawings, it should be understood that various changes and modifications are apparent to those skilled in the art. By way of example, the record feeder of the above described construction may be used for transferring any other sheet material than the disc record between a pair of spaced working positions. Therefore, unless otherwise such changes and modifications depart from the subsequently claimed scope of the present invention, they should be understood as included therein.

What we claimed is:

1. A record feeding device for use in association with a video disc record of the type utilizing a flexible foil-type disc adapted to be driven only at its center at a relatively high speed and concurrently adapted to hover on a rotation-induced air cushion above a stationary table during rotation of said disc record, said record feeding device comprising:

a cylindrical transfer roll supported above and adjacent to an outer peripheral portion of the stationary table for rotation about the longitudinal fixed axis thereof, said longitudinal axis of said cylindrical transfer roll extending parallel to the plane of a jacket receiving surface on which a jacket, accommodating therein said flexible foil-type record, is placed and also to the plane of said stationary table, said longitudinal axis further extending at right angles to the axis of rotation of said disc record, said cylindrical transfer roll having at least one escapement recess means on the outer peripheral surface thereof, said escapement recess means being inwardly recessed from the outer peripheral surface of said transfer roll and extending substantially over the total width of said transfer roll, said cylindrical transfer roll being adapted to rotate in one direction to transport the flexible foil-type disc record from the jacket receiving surface onto said stationary table in readiness for the disc record to be rotated and also to rotate in the opposite direction to transfer the same disc record from the stationary table back to said jacket receiving surface, wherein said cylindrical transfer roll does not rotate during rotation of the flexible foil-type record, wherein when said disc record is to be transported from said jacket receiving surface to said stationary table and from said stationary table back to said jacket receiving surface, said escapement recess means is positioned adjacent to and clear of an outer peripheral portion of said disc record, and wherein when said disc record is rotating above said stationary table, said escapement recess means is in a position to avoid interference between said disc record and said transfer roll; and cooperative means which cooperate with said transfer roll for causing said disc record to move between said jacket receiving surface and said stationary table in response to rotation of said transfer roll, said cooperative means and said transfer roll defining a curved path therebetween coaxial with the longitudinal axis of said transfer roll for the passage of said disc record between said jacket receiving surface and said stationary table, said disc record when moved through said curved path during rotation of said transfer roll in any of said directions having the opposite surfaces frictionally and slidingly contacting said transfer roll and cooperative means, respectively.

2. A record feeding device as claimed in claim 1, wherein said transfer roll includes a friction lining lined on the outer peripheral surface of said transfer roll, said friction lining being made of elastic material having a relatively high frictional coefficient.

3. A record feeding device as claimed in claim 2, wherein said cooperative means comprises a back-up guide positioned on one side of the transfer roll remote from the stationary table and having an inwardly rounded surface facing said transfer roll to define the curved path between it and said transfer roll.

4. A record feeding device as claimed in claim 2, wherein said cooperative means comprises a portion of the stationary table adjacent the outer periphery thereof, said portion being inwardly rounded to fit to the curvature of said transfer roll to define the curved path between it and said transfer roll.

* * * * *